(12) United States Patent  (10) Patent No.: US 7,393,601 B1
Chen et al.  (45) Date of Patent: Jul. 1, 2008

(54) WEAK ANTIFERROMAGNETICALLY COUPLED MEDIA WITH A FIVE ELEMENT MAGNETIC ALLOY AND A LOW MOMENT STABILIZING LAYER

(75) Inventors: Charles Changqing Chen, Milpitas, CA (US); Shoutao Wang, Fremont, CA (US); Alan Huang, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 303 days.

(21) Appl. No.: 10/911,500

(22) Filed: Aug. 5, 2004

(51) Int. Cl.
*G11B 5/66* (2006.01)
*G11B 5/70* (2006.01)
(52) U.S. Cl. ..................... 428/828; 427/131
(58) Field of Classification Search ............. 428/827, 428/828.1
See application file for complete search history.

(56) References Cited

U.S. PATENT DOCUMENTS

| | | | |
|---|---|---|---|
| 6,129,981 A | 10/2000 | Okuyama et al. | |
| 6,372,330 B1 * | 4/2002 | Do et al. | 428/212 |
| 6,503,600 B2 | 1/2003 | Watanabe et al. | |
| 6,548,194 B2 | 4/2003 | Hikosaka et al. | |
| 6,610,424 B1 | 8/2003 | Acharya et al. | |
| 6,727,010 B2 | 4/2004 | Hanawa et al. | |
| 6,835,475 B2 * | 12/2004 | Carey et al. | 428/828.1 |
| 6,878,460 B1 * | 4/2005 | Hailu et al. | 428/828.1 |
| 2003/0059648 A1 | 3/2003 | Akimoto et al. | |
| 2003/0104253 A1 | 6/2003 | Osawa et al. | |
| 2003/0148143 A1 | 8/2003 | Kanbe et al. | |
| 2004/0023074 A1 | 2/2004 | Shimizu et al. | |

* cited by examiner

*Primary Examiner*—Holly Rickman
(74) *Attorney, Agent, or Firm*—Darby & Darby PC

(57) ABSTRACT

A magnetic recording medium having a substrate, underlayer, a low moment stabilizing layer, an antiferromagnetic coupling layer, a low magnetic layer having a magnetic saturation of equal to or less than 250 emu/cm$^2$, and a high moment magnetic layer having a magnetic saturation of more than 250 emu/cm$^2$, in this order, is disclosed. The magnetic recording medium has a weak coupling strength of Jex $\leq$0.05.

15 Claims, 4 Drawing Sheets

WEAK ANTIFERROMAGNETICALLY COUPLED MEDIA WITH A FIVE ELEMENT MAGNETIC ALLOY AND A LOW MOMENT STABILIZING LAYER

FIELD OF INVENTION

The present invention relates to the recording, storage and reading of magnetic data, particularly magnetic recording media having a structure of weak, anti-ferromagnetically coupled (AFC) media with a five element magnetic alloy and a low moment stabilizing layer.

BACKGROUND

Magnetic disks and disk drives are employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

In a magnetic media, digital information (expressed as combinations of "0's" and "1's") is written on tiny magnetic bits (which themselves are made up of many even smaller grains). When a bit is written, a magnetic field produced by the disc drive's head orients the bit's magnetization in a particular direction, corresponding to either a 0 or 1. The magnetism in the head in essence "flips" the magnetization in the bit between two stable orientations.

Magnetic thin-film media, wherein a fine grained polycrystalline magnetic alloy layer serves as the active recording medium layer, are generally classified as "longitudinal" or "perpendicular," depending on the orientation of the magnetic domains of the grains of the magnetic material. In longitudinal media (also often referred as "conventional" media), the magnetization in the bits is flipped between lying parallel and anti-parallel to the direction in which the head is moving relative to the disc. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

FIG. 1 shows a disk recording medium and a cross section of a disc showing the difference between longitudinal and perpendicular recording. Even though FIG. 1 shows one side of the non-magnetic disk, magnetic recording layers are sputter deposited on both sides of the non-magnetic aluminum substrate of FIG. 1. Also, even though FIG. 1 shows an aluminum substrate, other embodiments include a substrate made of glass, glass-ceramic, NiP/aluminum, metal alloys, plastic/polymer material, ceramic, glass-polymer, composite materials or other non-magnetic materials.

Efforts are continually being made to increase the areal recording density, i.e., the bit density, or bits/unit area, and signal-to-medium noise ratio (SMNR) of the magnetic media. To continue pushing areal densities and increase overall storage capacity, the data bits must be made smaller and put closer together. However, there are limits to how small the bits may be made. If the bit becomes too small, the magnetic energy holding the bit in place may become so small that thermal energy may cause it to demagnetize over time. This phenomenon is known as superparamagnetism. To avoid superparamagnetic effects, disc media manufacturers have been increasing the coercivity (the "field" required to write a bit) of the disc. However, the fields that can be applied are limited by the magnetic materials from which the head is made, and these limits are being approached.

The increasing demands for higher areal recording density impose increasingly greater demands on thin film magnetic recording media in terms of coercivity (Hc), remanent coercivity (Hcr), magnetic remanance (Mr), which is the magnetic moment per unit volume of ferromagnetic material, coercivity squareness (S*), SMNR, over-write (OW), bit-error rate (BER), decay rate (DR) and thermal stability of the media. These parameters are important to the recording performance and depend primarily on the microstructure of the materials of the media. For example, as the SMNR is reduced by decreasing the grain size or reducing exchange coupling between grains, it has been observed that the thermal stability of the media decreases.

Newer longitudinal recording methods could allow beyond 140 gigabits per square inch in density. A great challenge however is maintaining a strong signal for the bits recorded on the media. When the bit size is reduced, the signal is decreased, making the bits more difficult to detect, as well as more difficult to maintain stable after recording information.

One of the key challenges to extending magnetic recording technology beyond the currently achieved 35-100 Gbit/in$^2$ areal densities is to improve the signal to noise ratio by media noise suppression. However, as the storage density of magnetic recording disks has increased, the product of Mr and the magnetic layer thickness t has decreased and Hcr of the magnetic layer has increased. This has led to a decrease in the ratio Mrt/Hcr. To achieve a reduction in Mrt, the thickness t of the magnetic layer has been reduced, but only to a limit because the magnetization in the layer becomes susceptible to thermal decay. This decay has been attributed to thermal activation of small magnetic grains (the super-paramagnetic effect). The thermal stability of a magnetic grain is to a large extent determined by $K_u V$, where $K_u$ is the magnetic anisotropy constant of the magnetic layer and V is the volume of the magnetic grain. As the magnetic layer thickness is decreased, V decreases. Thus, if the magnetic layer thickness is too thin, the stored magnetic information might no longer be stable at normal disk drive operating conditions.

The increase in $K_u$ is limited to the point where the coercivity $H_c$, which is approximately equal to $K_u/Mr$, becomes too large to be written by a conventional recording head. On the other hand, a reduction in Mr of the magnetic layer for a fixed layer thickness is limited by the coercivity that can be written. Increasing V by increasing inter-granular exchange can also increase thermal stability. However, this approach could result in a reduction in the SMNR of the magnetic layer.

In order to squeeze as much digital information as possible on a recording disc medium there is a need to find a film structure, which can benefit the low noise feature of laminated medium, but has acceptable thermal stability. Anti-ferromagnetically coupled (AFC) dual-layer media having with a five element magnetic alloy and a low moment stabilizing layer have been unexpectedly found to improve magnetic recording performance with reduced grain size, enhanced grain segregation and maintained high magnetic saturation (Ms) and magneto-crystalline anisotropy.

SUMMARY OF THE INVENTION

Fifth element has been added into four-element alloys such as CoCrPtB and CoCrPtTa to improve magnetic recording performance with reduced grain size, enhanced grain segregation and maintained high Ms and magneto-crystalline anisotropy. Preferably, the fifth element has a larger atomic radius than that of Co or Cr for refining the grain of magnetic thin film layer. Zirconium has been identified to be one of the preferred fifth elements. The results of this invention show significant improvement in recording performance of media with magnetic layers made of Zr element added Co based alloys. Other elements instead of Zr could include Ta, Cu, Ag, Nb, W, Mo, Zr, Hf, Ti, Au, etc. The record density of the new media of this invention was over 150 Gb/in$^2$. The recording media of this invention is a longitudinal media, which could include an aluminum substrate and/or a non-conductive glass substrate. The nominal grain size of the new media has been reduced to 10 angstroms or less with a grain distribution in 1-3 angstroms of standard deviation.

This invention preferably relates a magnetic recording medium comprising a magnetic recording medium comprising a substrate, a low moment stabilizing layer, an antiferromagnetic coupling layer, a low magnetic layer, and a high moment magnetic layer, in this order, wherein the magnetic recording medium has a weak coupling strength of Jex $\leq 0.05$. In one variation, the magnetic recording medium further comprises a non-magnetic underlayer between the substrate and the low moment stabilizing layer. Preferably, the low moment stabilizing layer comprises an alloy selected from the group consisting of CoCrTa, CoCrB, CoCrPtB, CoCrZr, and combinations thereof. Preferably, the antiferromagnetic coupling layer comprises Ru. More preferably, the low moment magnetic layer comprises $Co_{1-x-y-z-\alpha}Cr_xPt_yB_zX_\alpha$, wherein X is selected from the group consisting of Ta, Cu, Ag, Nb, W, Mo, Zr, Hf, Ti, Au, and combinations thereof, and x, y, z, $\alpha$ are atomic concentrations as follows: x=18%-28%, y=6%-20%, z=2%-15%, $\alpha$=0%-8%. Further preferably, the high moment magnetic layer comprises $Co_{1-x-y-z-\alpha}Cr_xPt_yB_zX_\alpha$, wherein X is selected from the group consisting of Ta, Cu, Ag, Nb, W, Mo, Zr, Hf, Ti, Au, and combinations thereof, and x, y, z, $\alpha$ are atomic concentrations as follows: x=6%-18%, y=6%-20%, z=5%-18%, $\alpha$=0%-8%. In one variation, the underlayer comprises Cr.

In a preferred embodiment, the substrate is an aluminum substrate, the low moment stabilizing layer comprises CoCrZa and has a thickness in the range of about 10 Å to about 50 Å, the antiferromagnetic coupling layer comprises Ru, the low magnetic layer comprises CoCrPtBZr and has an Ms of less than 250 emu/cm$^2$, and the high moment magnetic layer comprises CoCrPtBZr and has an Ms of more than 250 emu/cm$^2$. Compared to one of best conventional media which was applied to the demonstration of 144 Gb2/in2, the media made with weak AFC design together with five elements alloys have significant improved BER performance.

Another embodiment is a method of manufacturing the magnetic recording medium. Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

DETAILED DESCRIPTION

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

Figure 2:
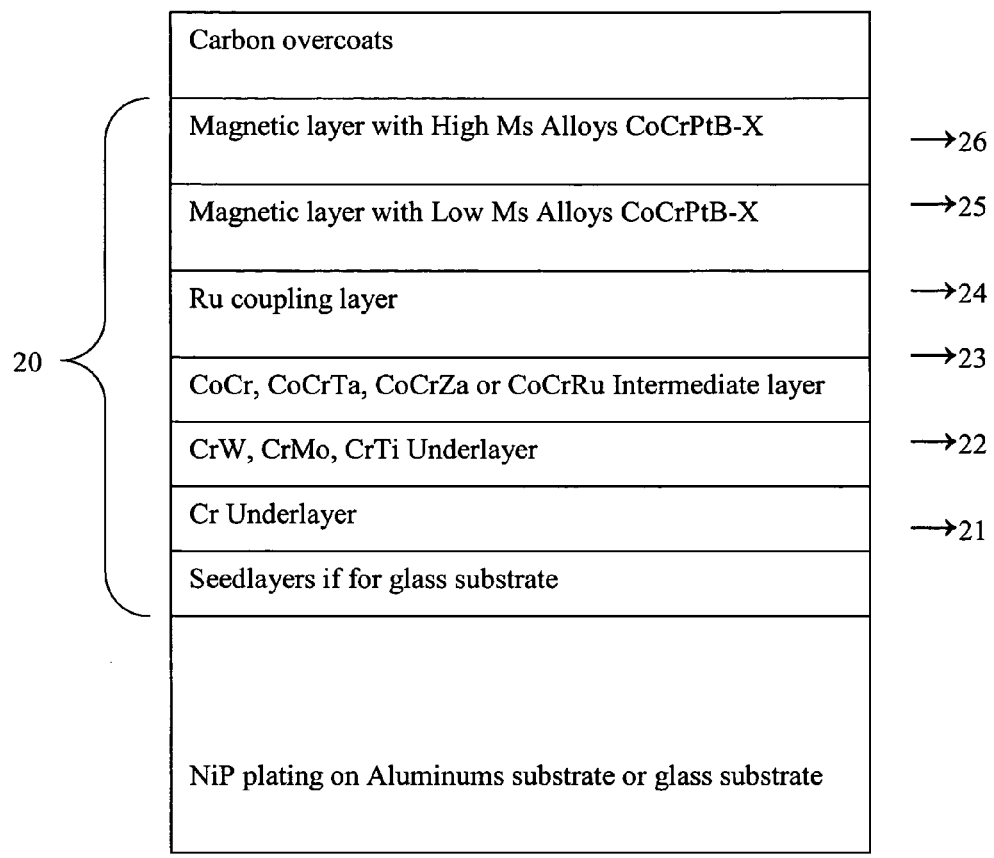
FIG. 2 shows magnetic media structure for antiferromagnetic coupling media coupling media.

A cross sectional view of a longitudinal recording medium of this invention is depicted in FIG. 2. The structure of the preferred media of this invention includes:

(1) a substrate, which could be aluminum or glass:

(2) a non-magnetic seedlayer and underlayer, to promote the crystallographic texture of Co based alloys, dependent on what type of substrate, for example, for a glass substrate, the seedlayer could be of amorphous or fine grain materials such as NiAl, RuAl, CoW, CrTi while Cr based alloys could be used for underlayers;

(3) a low moment magnetic intermediate layer or a low moment stabilizing layer including CoCrTa, CoCrB, CoCrPtB, CoCrZr, etc. alloys;

(4) a Ru-containing layer for antiferromagnetic coupling;

(5) a low moment magnetic layer with high grain segregation, whose composition could be $Co_{1-x-y-z-\alpha}Cr_xPt_yB_zX_\alpha$, where X is the fifth element including Ta, Cu, Ag, Nb, W, Mo, Zr, Hf, Ti, Au, etc. and x, y, z, $\alpha$ are atomic concentrations as follows: x=18%-28%, y=6%-20%, z=2%-15%, $\alpha$=0%-8%; and (6) a high moment magnetic layers for low spacing, whose composition could be $Co_{1-x-y-z-\alpha}Cr_xPt_yB_zX_\alpha$, where X is the fifth element including Ta, Cu, Ag, Nb, W, Mo, Zr, Hf, Ti, Au, etc. and x, y, z, $\alpha$ are atomic concentrations as follows: x=6%-18%, y=6%-20%, z=5%-18%, $\alpha$=0%-8%.

The longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

The five element magnetic layer alloys of this invention could be CoCrPtB—Zr, CoCrPtTa—Zr, for example. Zr has large atomic radius and relatively high melting points compared Co and Cr and non-soluble to Co, thereby it promotes physical grain-size refinement and grain segregation. The fifth element could also enhance the formation of an amorphous grain-boundary phase in the magnetic layers. The fifth element such as Zr could be added to the alloys of the intermediate layer or the stabilizing layer, the coupling layer and in the magnetic layers.

Instead, of a NiP seedlayer, the layer on the substrate could be any Ni-containing seedlayer such as a NiNb seedlayer, a Cr/NiNb seedlayer, or any other Ni-containing seedlayer. Optionally, there could be an adhesion layer between the substrate and the seedlayer. The surface of the Ni-containing seedlayer could be optionally oxidized.

In FIG. 2, the thickness of the seedlayer is about 20 Å to about 2000 Å, the thickness of the underlayers 21 and 22 is about 10 Å to about 200 Å, preferably, about 25 Å to about 100 Å, the thickness the intermediate layer 23 is about 10 Å to about 160 Å, preferably, about 20 Å to about 60 Å, the thickness of the coupling layer 24 is about 1 Å to about 20 Å, preferably, about 5 Å to about 10 Å, the thickness of the magnetic layer 25 is about 20 Å to about 300 Å, preferably, about 50 Å to about 200 Å, and the thickness of the magnetic layer 26 is about 10 Å to about 350 Å, preferably, about 40 Å to about 180 Å. A further embodiment includes an adhesion layer, the thickness of the adhesion layer is about 3 Å to about 100 Å. In a preferred embodiment, the thickness of the protective layer is 10 Å to about 100 Å, preferably between 20 Å and 60 Å, and most preferably about 30 Å. The protective layer is made of hydrogenated carbon ($CH_x$).

The magnetic recording medium has a remanent coercivity of about 3000 to about 6,000 Oersted, and an $M_rt$ (product of remanance, Mr, and magnetic layer thickness, t) of about 0.25 to about 0.50 memu/cm$^2$. In a preferred embodiment, the coercivity is about 3500 to about 5500 Oersted, more preferably in the range of about 4000 to about 5000 Oersted, and most preferably in the range of about 4000 to about 5000 Oersted. In a preferred embodiment, the Mrt is about 0.25 to about 0.5 memu/cm$^2$, more preferably in the range of about 0.25 to about 0.45 memu/cm$^2$, and most preferably in the range of about 0.3 to about 0.4 memu/cm$^2$.

When referring to magnetic recording media, there are two basic types: oriented and isotropic. Isotropic media has the magnetic layer and under-layers, which are used to control the crystallographic orientation of the magnetic layer, applied to a non-preferentially polished substrate. Oriented media has a scratch pattern or texture on the disc surface. The texture improves magnetic orientation and enhances film performance by initiating grain growth. Also, the texture causes magnetic properties in down-track and cross-track directions to be different, which could greatly increase media signal-to-noise ratio, thereby greatly improving media performance and density. To texture the surface of a glass substrate, seedlayer materials such as a nickel phosphorus layer is applied, which is then textured. This recording media of this invention could be oriented or isotropic, though oriented media using textured substrate is preferred. The substrate could be a glass substrate or aluminum substrate, preferably with a NiP coating.

Methods for manufacturing a longitudinal magnetic recording medium with a glass, glass-ceramic, Al or Al—NiP substrate may also comprise applying a seedlayer between the substrate and underlayer. A seedlayer seeds the nucleation of a particular crystallographic texture of the underlayer. A seedlayer is the first deposited layer on the non-magnetic substrate. The role of this layer is to texture (alignment) the crystallographic orientation of the subsequent Cr-containing underlayer, and might also produce small grain size, which is desired for the purpose of reducing recording noise.

The seedlayer, underlayer, and magnetic layer are sequentially sputter deposited on the substrate in an inert gas atmosphere, such as an atmosphere of argon. A carbon overcoat is typically deposited in argon with nitrogen, hydrogen or ethylene. Lubricant topcoats could be about 20 Å thick.

Almost all the manufacturing of a disk media takes place in clean rooms where the amount of dust in the atmosphere is kept very low, and is strictly controlled and monitored. After one or more cleaning and texturing processes on a non-magnetic substrate, the substrate has an ultra-clean surface and is ready for the deposition of layers of magnetic media on the substrate.

Each of the layers constituting magnetic recording media of the present invention, except for a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping of the medium into a bath containing a solution of the lubricant compound, followed by removal of excess liquid, as by wiping, or by a vapor lube deposition method.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the topcoat layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

A substrate material employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

A magnetic material is composed of a number of submicroscopic regions called magnetic grains. Each grain contains parallel atomic magnetic moments and is magnetized to saturation, but the directions of magnetization of different grains are not necessarily parallel. In the absence of an applied magnetic field, adjacent grains may be oriented randomly in any number of several directions, called the directions of easy magnetization, which depend on the geometry of the crystal, stress, etc. The resultant effect of all these various directions of magnetization may be zero, as is the case with an unmagnetized specimen. When a magnetic field is applied, the grains will have their moment align parallel to the direction of the applied field when the applied field is sufficiently high for this magnetic grain, until all grains are aligned to the same direction, and the material reaches the point of saturation magnetization.

The ease of magnetization or demagnetization of a magnetic material depends on the crystalline structure, grain orientation, the state of strain, and the direction of the magnetic field. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes. A magnetic material is said to possess a uniaxial anisotropy when the easy axis is oriented along a single crystallographic direction, and to possess multiaxial anisotropy when the easy axis aligns with multiple crystallographic directions.

"Anisotropy energy" is the work against the anisotropy force to turn magnetization vector away from an easy direction. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization from an easy direction into the hard axis of magnetization, which is along a cubic body diagonal.

The anisotropy energy $U_A$ could be expressed in an ascending power series of the direction cosines between the magnetization and the crystal axes. For cubic crystals, the lowest-order terms take the form of Equation (1), $$U_A = K_1(\alpha_1^2\alpha_2^2 + \alpha_2^2\alpha_3^2 + \alpha_3^2\alpha_1^2) + K_2(\alpha_1^2\alpha_2^2\alpha_3^2) \quad (1)$$

where $\alpha_1$, $\alpha_2$ and $\alpha_3$ are direction cosines with respect to the cubic axes, and $K_1$ and $K_2$ are temperature-dependent parameters characteristic of the material, called anisotropy constants.

Anisotropy constants can be determined from (1) analysis of magnetization curves, (2) the torque on single crystals in a large applied field, and (3) single crystal magnetic resonance. The term "anisotropy constant" is often referred to as magnetocrystalline anisotropy constant.

While Equation (1) applies for a cubic lattice, similar equations are also known for other lattice systems. For example, for a hexagonal close packed (HCP) lattice, the equation for $U_A$ is the following:

$$U_A = K_1 \sin^2\theta + K_2 \sin^4\theta \quad (2)$$

where $\theta$ is the angle between the Ms vector, i.e., the saturation magnetization direction, and the c axis (easy axis), and $K_1$ and $K_2$ are anisotropy constants.

The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

For thin film longitudinal magnetic recording media, the desired crystalline structure of the Co and Co alloys is HCP with uniaxial crystalline anisotropy and a magnetization easy direction along the c-axis lies in the plane of the film. The better the in-plane c-axis crystallographic texture, the higher the magnetic remanance of the Co alloy thin film used for longitudinal recording. For very small grain sizes coercivity increases with increased grain size. As grain size increases, noise increases. To achieve a low noise magnetic medium, the Co alloy thin film should have uniform small grains with grain boundaries that can efficiently isolate neighboring grain to reduce medium noise. This kind of microstructure and crystallographic texture is normally achieved by manipulating the deposition process, or most often by the proper use of an underlayer.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Figure 1:
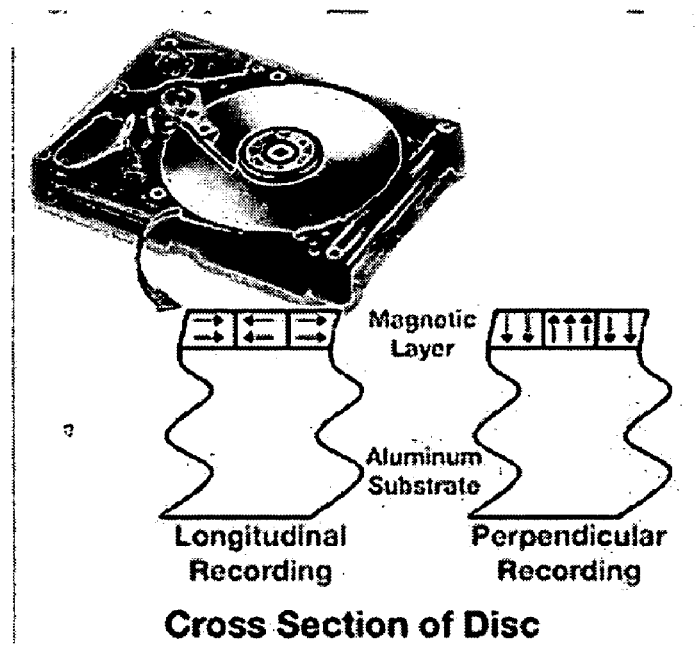
FIG. 1 schematically shows a magnetic disk recording medium comparing longitudinal or perpendicular recording.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I-III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by providing (1) a low moment magnetic intermediate layer or a low moment stabilizing layer including and (2) a Ru-containing layer between two Co-containing five-element magnetic layers, to produce improved thermal stability of the magnetic layers. Preferably, one of the two Co-containing five-element magnetic layer is a low moment magnetic layer and the other layer is a high moment magnetic layer.

In this application, "low moment" refers to alloys with Ms equal to or less than 250 emu/cm$^3$ whereas "high moment" refers to alloys with Ms more than 250 emu/cm$^3$. Also, word "containing," for example in Ru-containing, means that the layer comprises the elements or compounds before the word "containing" but the layer could still include other elements and compounds.

The ratio $K_u/k_B T$ determines the thermal stability of magnetic recording media. In other words, it estimates the signal decay of the magnetic recording media. In the above ratio, $K_u$ is an anisotropy constant defined by the equation $K_u = K_1 + 2K_2$, wherein $K_1$ and $K_2$ are the anisotropy constants of Equation (2), V is the volume of magnetic switching units, which can approximately be represented by magnetic grains, $K_B$ is Boltzman's constant and T is temperature in Kelvin. Lu and Charap, "Thermal instability at 10 Gbit/in$^2$ magnetic recording," IEEE TRANSACTION ON MAGNETICS, Vol. 30, No. 6, pp. 4230-4232, November 1994, discloses that $K_u V/k_B T$ must be at least 60 in order for the written bits to be marginally stable. In this application, the term "thermally stable" in the claims refer to magnetic recording media having $K_u V/k_B T$ must be at least 100.

Exchange is largely a nearest-neighbor phenomenon that occurs across distances typical of the distance between atoms in a solid (a few angstroms). If there is one atomic interlayer of one material between two layers, then that may be enough (though thicker interlayer could also by used) to destroy or further stabilize the exchange between the two layers separated by the interlayer.

One way to result in an improvement in the signal to noise ratio (SNR) of longitudinal magnetic recording media (for further increasing the recording density) is by decreasing the average grain volume, V, as explained above. The attainable SNR increases as $\sim N^{1/2}$ with the number of grains, N, per recorded transition as well as with decreasing Mrt of the recording media. $M_r t$ is the product of the remanent magnetization, $M_r$, and the film thickness, t, of the magnetic material. Both ways to increase SNR lead to a smaller energy barrier, $K_u V$, which resists magnetization reversal due to thermal agitation. The volume reduction can be partially offset by increasing the anisotropy of the material used in the media, but the available writing fields limit the anisotropy increase. Also, anti-ferromagnetically coupled (AFC) media could be used for increasing recording density of longitudinal magnetic recording media.

The signal voltage produced by the magnetic media is proportional to Mrt, which contains all the media parameters. For example, in the case of a particulate media, the particles of the magnetic material are relatively apart and have low $M_r$; hence, such a media would require a large film thickness of the magnetic layer to produce a high Mrt. On the other hand, a film using materials in which approximately 100% of the material is magnetic can give adequate signal voltage with even a thin film because the $M_r t$ of such a film can be sufficiently large.

In AFC media the main recording layer, ML, is anti-ferromagnetically coupled across a Ru spacer layer with a magnetic stabilization layer, SL. Thus, the stability of the main recording layer increases due to increased coupling with a SL and due to the decrease of the demagnetization field that the main layer experience.

Figure 3:
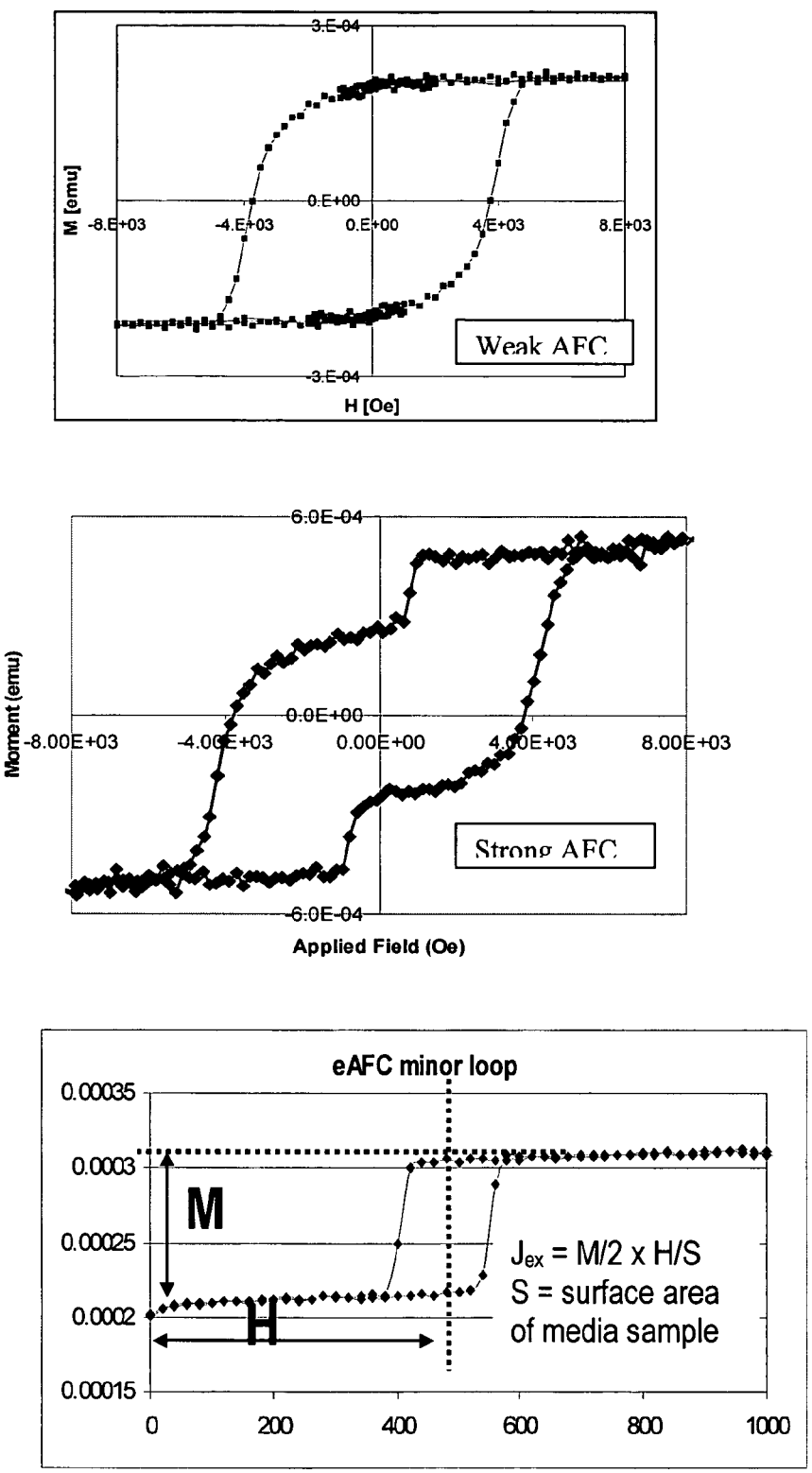
FIG. 3 hysteresis loops of weak and strong coupling AFC media

The coupling strength is determined by Jex, which is calculated from the shape of the hysteresis loop by the formula shown in FIG. 3 (bottom). In this application, "a strong coupling strength" refers to media having a coupling strength of Jex >0.05 while "a weak coupling strength" refers to media having a coupling strength of Jex ≦0.05. FIG. 3 shows hysteresis loops of weak (top) and strong (middle) coupling AFC media.

The methods of determining other magnetic properties of the media and the significance of each of the magnetic properties are described below:

(1) Hc (Oe): A magnetometer could be used to measure the hysteresis loop. On the hysteresis loop, the value of field for which magnetic moment equals zero is called the coercivity Hc. For magnetic recording media, the higher the Hc, the more stable the media, but Hc is constrained by the writing field from the head.

(2) Mrt (memu/cm$^2$): On the hysteresis loop, the magnetization for H=0 is the remanent magnetization Mr. Mrt is the remanent magnetization times the magnetic film thickness. In the recording media, the lower Mrt (with constant Hc), the less transition noise, but it is constrained by the sensitivity of the reading head.

(3) S*: On the hysteresis loop, the S* is defined as 1−(Mr/Hc)(1/slope at Hc). The closer this value to 1, the narrower is the switching field distribution.

(4) OW (db): The overwrite is measured on a spin-stand. The measurement sequence is as follows: first a low frequency signal is written on the media, second a high frequency signal is written on the same track and then the low frequency signal is read back. Higher OW (in absolute value) means that the media has good writeability.

(5) SMNR (db): SMNR is the media signal to noise ratio.

(6) BER (decade): BER is the bit error rate in log scale. For example, BER will be −6 for one bit error in 1 million bits. The larger the BER value, there is less error and the media is better.

(7) DR: DR is the decay rate. The signal decays due to thermal agitation and demagnetizing fields. Lower DR means the media is more stable. The decay rate is also related to KuV/kt; higher KuV/kt implies a lower decay rate and better thermal decay.

In this invention it was unexpectedly found that media having weak AFC coupling with a five element magnetic alloy and a low moment stabilizing layer have superior magnetic properties in terms of OW, SMNR, BER and DR than similar media having strong coupling. It was also found that media having weak AFC coupling with a five element magnetic alloy and a low moment stabilizing layer have superior magnetic properties in terms of OW, SMNR, BER and DR than similar media having no AFC coupling ("conventional media"). The Examples demonstrate the unexpected results.

EXAMPLES

FIG. 2 illustrates antiferromagnetic coupling media structure and scheme. Multi layers thin films were sputtered on textured NiP plating aluminum substrate. The thin films consist of dual underlayers (21, 22), single or dual stabilizing layer (23), Ru coupling layer (24) and dual magnetic layers (25, 26). Of them, layer 23 is made of new material of Zr element added Co based alloys. Layers 25 and 26 could be also made from Zr added CoCrPtB based alloys. Table 1 shows the composition and thickness of the underlayers and coupling layer of the examples tested.

TABLE 1

Composition and thickness of the media tested.

| Layer Number (Refer to FIG. 2) | Composition | Atomic Composition | Thickness (Å) |
|---|---|---|---|
| Coupling layer 24 | Ru | Ru | 8 |
| Underlayer 22 | CoCrZr | $Co_{65-75}Cr_{10-25}Zr_{2-10}$ | 20, 40, 60 & 80 |
| Underlayer 21 | CrMo | $CrMo_{5-25}$ | 50 |

Each sample was fabricated under substantially same sputter process conditions, with selected alloys mentioned above. Each sample comprised a Cr and CrX (X=W, Mo or Ti) dual underlayers, a CoCr, CoCrTa, a CoCrZr or CoCrRu intermediate layer, a CoCrPtB—X and CoCrPtB dual magnetic layers epitaxially grown thereon, and a NiP plated aluminum substrate having texture with an average surface roughness (Ra) of 1.8 angstroms. Sputtering was conducted in in-line machine with a DC magnetron apparatus and pulsed for bottom magnetic layer with extra element added Co based alloys. The system vacuum was at low $10^{-7}$ torr base pressure. The substrate was pre-heated to 280° C. before sputter and the sputter pressure was maintained at a level from 4 mtorr to 10 mtorr with substrate bias at −250 Volts.

Figure 4:
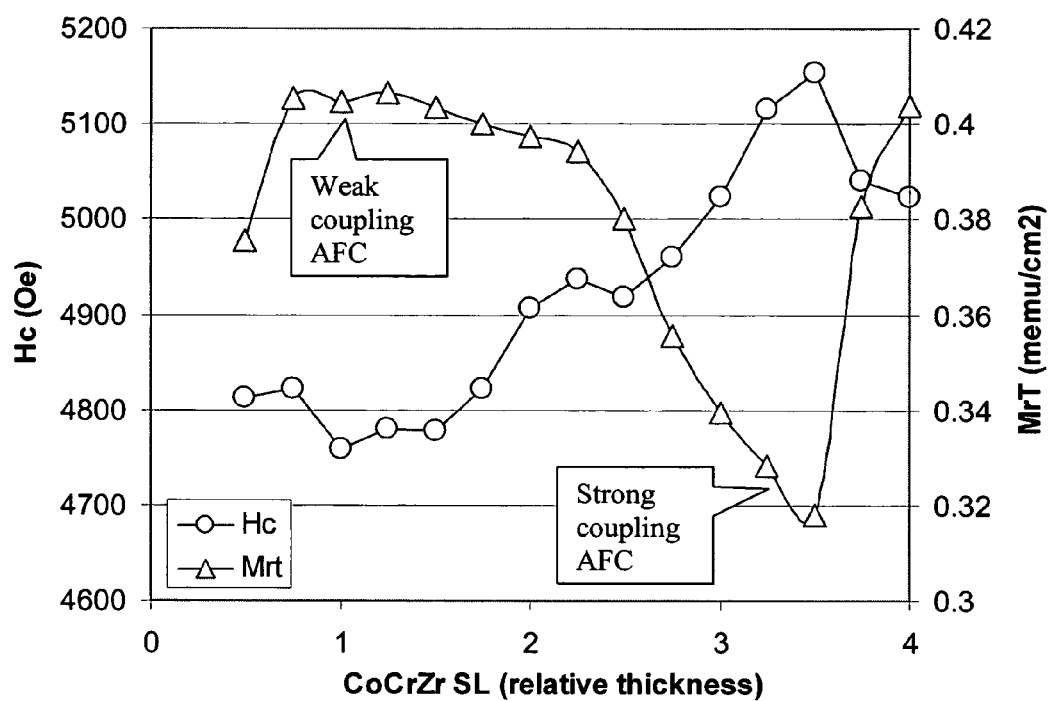
FIG. 4 shows the effect of the thickness of a CoCrZr stabilizing layer on Hc and Mrt.

FIG. 4 shows the CoCrZr stabilizing layer (SL) thickness effect on Hc and Mrt for media structure: UL1|UL2|SL|Ru|Mag1|Mag2, wherein the SL layer thickness was varied from 20 Å to 80 Å, which are referred in FIG. 4 as relative thickness 1 to 4. FIG. 4 shows that the coupling strength of the Ru layer could be controlled by the SL layer, which was totally unexpected.

The magnetic properties of samples were measured on a non-destructive turbo rotating disk magnetometer. The recording performance and equalized media signal to noise ratio was measured in Canon Guzik spin stand tester at 768 kbpi linear density and 450 Mbps data rate with a 135 ktpi TGMR head. The results are reported in Table 2 which shows Hc, Mrt, S* and SMNR respectively for both weak coupling AFC media and strong coupling AFC media compared to 144 Gbit/in$^2$ demo media. The weak coupling AFC media showed 0.5 db media SNR and 0.5 decade BER improvement. The strong coupling AFC showed similar electric performance as 144 Gbit/in$^2$ demo media. Compared to 144 Gbit/in$^2$ demo media, the new media made with CoCrZr showed improved 0.2-0.5 decade gain in BER which is quite significant.

TABLE 2

Electrical performance of media made from Zr added alloys

| | Hc (Oe) | Mrt (memu/cm$^2$) | S* | OW (db) | SMNR (db) | BER (decade) | DR |
|---|---|---|---|---|---|---|---|
| 144 Gbit/in$^2$ demo conventional media | 4430 | 0.33 | 0.868 | −32.4 | 15.7 | 6.00 | 1.6% |
| Weak coupling AFC with 20 Å CoCrZr layer | 4051 | 0.33 | 0.861 | −34.2 | 16.2 | 6.50 | 2.3% |
| Strong coupling AFC with 60 Å CoCrZr layer | 4474 | 0.32 | 0.919 | −31.8 | 15.9 | 6.20 | 1.5% |

The specific mechanism involved in achieving improved magnetic performance by applying Zr element added to Co based alloy is not known with certainty. However it is believed that the addition of Zr into Co based alloys reduced the grain size with further grain segregation. Other elements instead of Zr could include Ta, Cu, Ag, Nb, W, Mo, Zr, Hf, Ti, Au, etc for similar magnetic performance improvement.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A magnetic recording medium comprising a substrate, a low moment stabilizing layer, an antiferromagnetic coupling layer, a low moment magnetic layer, and a high moment magnetic layer, in this order, wherein the magnetic recording medium has a weak coupling strength of Jex $\leq$0.05 wherein the low moment magnetic layer comprises a Co based alloy containing Zr.

2. The magnetic recording medium of claim 1, further comprising a non-magnetic underlayer between the substrate and the low moment stabilizing layer.

3. The magnetic recording medium of claim 1, wherein the low moment stabilizing layer comprises an alloy selected from the group consisting of CoCrTa, CoCrB, CoCrPtB, CoCrZr, and combinations thereof.

4. The magnetic recording medium of claim 1, wherein the antiferromagnetic coupling layer comprises Ru.

5. The magnetic recording medium of claim 1, wherein the low moment magnetic layer comprises $Co_{1-x-y-z-\alpha}Cr_xPt_yB_zX_\alpha$, wherein X is Zr and x, y, z, $\alpha$ are atomic concentrations as follows: x=18%-28%, y=6%-20%, z=2%-15%, $\alpha$ is greater than 0% and less than or equal to 8%.

6. The magnetic recording medium of claim 1, wherein the high moment magnetic layer comprises $Co_{1-x-y-z\alpha}Cr_xPt_yB_zX_\alpha$, wherein X is selected from the group consisting of Ta, Cu, Ag, Nb, W, Mo, Zr, Hf, Au, and combinations thereof and x, y, z, $\alpha$ are atomic concentrations as follows: x=6%-18%, y=6%-20%, z=5%-18%, $\alpha$ is greater than 0% and less than or equal to 8%.

7. The magnetic recording medium of claim 2, wherein the underlayer comprises Cr.

8. The magnetic recording medium of claim 1, wherein the substrate is an aluminum substrate, the low moment stabilizing layer comprises CoCrZr and has a thickness in the range of about 10 Å to about 50 Å, the antiferromagnetic coupling layer comprises Ru, the low magnetic layer comprises CoCrPtBZr and has an Ms of less than 250 emu/cm$^2$, and the high moment magnetic layer comprises CoCrPtBZr and has an Ms of more than 250 emu/cm$^2$.

9. A method of manufacturing a magnetic recording medium comprising obtaining a substrate and depositing, in this order, a low moment stabilizing layer, an antiferromagnetic coupling layer, a low moment magnetic layer, and a high moment magnetic layer, wherein the magnetic recording medium has a weak coupling strength of Jex $\leq$0.05 wherein the low moment magnetic layer comprises a Co based alloy containing Zr.

10. The method of claim 9, further depositing a non-magnetic underlayer between the substrate and the low moment stabilizing layer.

11. The method of claim 9, wherein the low moment stabilizing layer comprises an alloy selected from the group consisting of CoCrTa, CoCrB, CoCrPtB, CoCrZr, and combinations thereof.

12. The method of claim 9, wherein the antiferromagnetic coupling layer comprises Ru.

13. The method of claim 9, wherein the low moment magnetic layer comprises $Co_{1-x-y-z-\alpha}Cr_xPt_yB_zX_\alpha$, wherein X is Zr and x, y, z, $\alpha$ are atomic concentrations as follows: x=18%-28%, y=6%-20%, z=2%-15%, $\alpha$ is greater than 0% and less than or equal to 8%, wherein the high moment magnetic layer comprises $Co_{1-a-b-c-\delta}Cr_aPt_bB_cX_\delta$, wherein X is selected from the group consisting of Ta, Cu, Ag, Nb, W, Mo, Zr, Hf, Ti, Au, and combinations thereof, and a, b, c, $\delta$ are atomic concentrations as follows: a=6%-18%, b=6%-20%, c=5%-18%, $\delta$ is greater than 0% and less than or equal to 8%.

14. The method of claim 10, wherein the underlayer comprises Cr.

15. The method of claim 9, wherein the substrate is an aluminum substrate, the low moment stabilizing layer comprises CoCrZr and has a thickness in the range of about 10 Å to about 50 Å, the antiferromagnetic coupling layer comprises Ru, the low magnetic layer comprises CoCrPtBZr and has an Ms of less than 250 emu/cm$^2$, and the high moment magnetic layer comprises CoCrPtBZr and has an Ms of more than 250 emu/cm$^2$.

* * * * *